United States Patent
Greaves et al.

(10) Patent No.: US 12,473,399 B2
(45) Date of Patent: Nov. 18, 2025

(54) LOW FOAMING HYDRAULIC FLUIDS HAVING BIODEGRADABLE POLYALKYLENE GLYCOL RHEOLOGY MODIFIERS USEFUL IN SUBSEA APPLICATIONS

(71) Applicant: Dow Global Technologies LLC, Midland, MI (US)

(72) Inventors: Martin R. Greaves, Baar (CH); Jochem Kersbulck, Hoek (NL)

(73) Assignee: Dow Global Technologies LLC, Midland, MI (US)

(*) Notice: Subject to any disclaimer, the term of this patent is extended or adjusted under 35 U.S.C. 154(b) by 382 days.

(21) Appl. No.: 18/007,077

(22) PCT Filed: Sep. 22, 2021

(86) PCT No.: PCT/US2021/051410
§ 371 (c)(1),
(2) Date: Jan. 27, 2023

(87) PCT Pub. No.: WO2022/072186
PCT Pub. Date: Apr. 7, 2022

(65) Prior Publication Data
US 2023/0312823 A1 Oct. 5, 2023

Related U.S. Application Data

(60) Provisional application No. 63/085,433, filed on Sep. 30, 2020.

(51) Int. Cl.
| | |
|---|---|
| *C08G 65/26* | (2006.01) |
| *C08L 71/02* | (2006.01) |
| *C10M 107/34* | (2006.01) |
| *C10M 173/02* | (2006.01) |
| *C10N 20/00* | (2006.01) |
| *C10N 20/02* | (2006.01) |
| *C10N 20/04* | (2006.01) |
| *C10N 30/02* | (2006.01) |
| *C10N 30/18* | (2006.01) |
| *C10N 40/04* | (2006.01) |
| *C10N 40/08* | (2006.01) |
| *C10N 40/20* | (2006.01) |

(52) U.S. Cl.
CPC ..... *C08G 65/2663* (2013.01); *C08G 65/2609* (2013.01); *C08G 65/2648* (2013.01); *C08G 65/269* (2013.01); *C08G 65/2696* (2013.01); *C08L 71/02* (2013.01); *C10M 107/34* (2013.01); *C10M 173/02* (2013.01); *C08G 2230/00* (2013.01); *C08G 2650/58* (2013.01); *C10M 2207/0225* (2013.01); *C10M 2209/1033* (2013.01); *C10M 2209/1036* (2013.01); *C10M 2209/104* (2013.01); *C10M 2209/1045* (2013.01); *C10M 2209/105* (2013.01); *C10M 2209/1055* (2013.01); *C10M 2209/107* (2013.01); *C10M 2209/1075* (2013.01); *C10N 2020/02* (2013.01); *C10N 2020/04* (2013.01); *C10N 2020/065* (2020.05); *C10N 2020/081* (2020.05); *C10N 2030/02* (2013.01); *C10N 2030/18* (2013.01); *C10N 2040/04* (2013.01); *C10N 2040/08* (2013.01); *C10N 2040/20* (2013.01)

(58) Field of Classification Search
CPC ........... C08G 65/2648; C08G 2230/00; C08G 2650/58; C08G 65/269; C08G 65/2609; C08G 65/2696; C10M 107/34; C10M 173/02; C10M 2209/1033; C10M 2209/1075; C10M 2207/0225; C10M 2209/1036; C10M 2209/104; C10M 2209/1045; C10M 2209/105; C10M 2209/1055; C10M 2209/107; C10N 2020/04; C10N 2020/081; C10N 2030/18; C10N 2040/08; C10N 2040/20; C10N 2020/02; C10N 2020/065; C10N 2030/02; C10N 2040/04; C08L 71/02
See application file for complete search history.

(56) References Cited

U.S. PATENT DOCUMENTS 7,001,634 B2    2/2006   Browne
8,969,511 B2    3/2015   Zander et al.

FOREIGN PATENT DOCUMENTS

| EP | 2679608 | 1/2014 |
| WO | 2005/113640 | 12/2005 |
| WO | 2008/089130 | 7/2008 |
| WO | 2020/086229 | 4/2020 |

OTHER PUBLICATIONS

Herzberger, Polymerization of Ethylene Oxide, Propylene Oxide, and Other Alkylene Oxides: Synthesis, Novel Polymer Architectures, and Bioconjugation, Chemical Reviews, 2016, 116, pp. 2170-2243.
PCT/US2021/051410, International Search Report and Written Opinion with a mailing date of Jan. 7, 2022.

*Primary Examiner* — Rabon A Sergent

(57) ABSTRACT

A composition comprising water and a polyalkylene glycol having an allyl content of less than 20 μeq/g, which composition has reduced foaming properties and preferably a biodegradability of at least 60% as determined using OECD 301F. The polyalkylene glycol can be made by forming a first intermediate comprising an oxypropylene block by reacting propylene oxide with a polyol initiator in the presence of a Double Metal Cyanide catalyst, and then reacting the first intermediate with ethylene oxide in the presence of a KOH catalyst.

9 Claims, No Drawings

LOW FOAMING HYDRAULIC FLUIDS HAVING BIODEGRADABLE POLYALKYLENE GLYCOL RHEOLOGY MODIFIERS USEFUL IN SUBSEA APPLICATIONS

FIELD OF THE INVENTION

The field of this invention is a water based lubricant that includes a biodegradable polyalkylene glycol (PAG). Examples of water based lubricants are metalworking fluids, gear oils, textile lubricants and hydraulic fluids. The invention is especially pertinent to water based hydraulic fluids.

BACKGROUND

Water based lubricants are commonly used as metalworking fluids such as cutting fluids. These are often described as soluble oils, semisynthetic and synthetic metalworking fluids. A key function is to cool and lubricate the interface between the cutting tool and the machined part. In the production engineering industry, there continues to be a trend to higher machining speeds. The impact on the fluid is that foaming is more prevalent. Thus there is a need for aqueous based metalworking fluids that offer lower and superior foaming performance. Water based metalworking fluids, and particularly synthetic metalworking fluids, can contain a polyalkylene glycol at levels of between 0.05 and 10% by weight of the fluid in use.

Another application for water based lubricant is in gear oils. Water based gear oils are effective at cooling the interface between the gears and in removing heat. Since gear oils result in turbulence and churning of the fluids, foaming can occur. Water based gear lubricants are increasingly used for their environmental benefits over hydrocarbon lubricants since they offer higher levels of biodegradability and are perceived as a more sustainable solution. It is desirable that water based gear lubricants offer low foaming performance. Water based gear lubricants can contain a polyalkylene glycol at levels of 5-95% as a thickening agent and lubricity additive.

A further application is water based hydraulic fluids. These are used in the steel and aluminium processing industries for their fire resistance properties and also in the mining industry. The PAGs used in these formulations are at typical treat levels of 5-25% by weight. In the oil and gas industry, water based subsea hydraulic fluids containing PAGs are used to control the flow of oil deep underwater. Occasionally these fluids are leaked or released into the ocean. Therefore, it is desirable to have biodegradable hydraulic fluids.

Many of these types of hydraulic fluids used in equipment contain water, a glycol and a relatively high molecular weight polyalkylene glycol (PAG) as a thickener or rheology modifier. These three components typically represent more than 90% by weight of a hydraulic fluid composition (with the remainder being an additive package comprising corrosion inhibitors, foam control additives, air release additives, friction modifiers and dyes) and it is desirable that each of these components offers a high degree of biodegradability so that the final formulation offers a high degree of biodegradability. The glycols used can be, for example, ethylene glycol, diethylene glycol, and propylene glycol and are readily biodegradable. The PAGs are typically random copolymers of ethylene oxide (EO) and propylene oxide (PO) (typically 1,2-propylene oxide) having molecular weights of about 12,000 g/mol or higher. These high molecular weight PAGs do not have the desired degree of biodegradability and have very low biodegradability. An example would be UCON™ 75-H-90,000 from the Dow Chemical Company Lower molecular weight PAGs are known to be more biodegradable but do not have sufficient thickening efficiency in a water/glycol base fluid for the desired applications.

Thus, it is desired to have a hydraulic fluid composition which has a high degree of biodegradability while also maintaining the desired rheology properties for the fluid. Moreover it would be preferable to include a biodegradable polyalkylene glycol at a treat level of less than 30% by weight of the total weight of the composition to help keep the formulation costs low. Additionally it is desirable that the formulation exhibits relatively low amounts of foaming.

SUMMARY OF THE INVENTION

Disclosed herein are compositions comprising water and one of more polyalkylene glycols in which the polyalkylene glycol is present at levels of 0.1 to 40%.

Specifically disclosed herein is a composition comprising 10 to 99.9 weight % water, 0 to 60 weight % of a glycol selected from ethylene glycol, diethylene glycol, triethylene glycol, tetra ethylene glycol and propylene glycol, 0.1 to 40 weight % of a polyalkylene glycol, and 0 to 10% of additives based on total weight of the composition wherein the polyalkylene glycol has a—molecular weight of no more than 4000 g/mol and is characterized in that it is an oxyethylene/oxypropylene block copolymer having a weight percent of oxyethylene of at least 20% based on total weight of the copolymer, and further characterized that the composition has an allyl content of less than 20 µeq allyl per gram of polyalkylene glycol (µeq/g).

Also disclosed herein is a method for making an oxyethylene/oxypropylene block copolymer comprising the steps of forming a first intermediate comprising an oxypropylene block in the presence of a Double Metal Cyanide ("DMC") catalyst (in the substantial absence of potassium hydroxide ("KOH") catalyst) and a second step of forming the block copolymer by forming one or more oxyethylene blocks onto the first intermediate in the presence of a KOH catalyst.

Also disclosed herein is a composition comprising water, a glycol, and a polyalkylene glycol having a biodegradability of at least 60% as determined using OECD 301F wherein the composition has a kinematic viscosity of at least 25 mm2/sec at 40° C.

DETAILED DESCRIPTION OF THE INVENTION

The composition disclosed herein comprises a polyalkylene glycol and water.

The polyalkylene glycol is preferably characterized in that it is biodegradable. Specifically, the biodegradability when measured using OECD 301F should be at least 60%, or at least 70% or at least 80% or at least 90%.

According to an embodiment, the polyalkylene glycol has a molecular weight of no more than 4000 g/mol, or no more than 3500 g/mol, or no more than 3000 g/mol but at least 1000 g/mol, or at least 1500 g/mol, or at least 2000 g/mol as measured by ASTM D4274.

The polyalkylene glycol is characterized in that it is a block copolymer of ethylene oxide ("EO") and propylene oxide ("PO") (especially 1,2-propylene oxide). The block formed from ethylene oxide is also referred to herein as oxyethylene or the oxyethylene block. The block formed from the propylene oxide is also referred to herein as oxypropylene or the oxypropylene block. The weight percent of ethylene oxide is greater than 20% or greater than 25% based on total weight of ethylene oxide and propylene oxide used in making the polyalkylene glycol. According to one embodiment, the weight percent of ethylene oxide is no greater than 45%, or no greater than 40% or no greater than 38%. The block copolymer may be linear or branched.

The polyalkylene glycol composition is further characterized in that it has an allyl content of 25 µeq/g or less, 20 µeq/g or less, 15 µeq/g or less or less than 5 µeq/g. Less allyl content is generally preferred, but some allyl can be tolerated such that the polyalkylene glycol composition may have zero µeq allyl per gram or at least 5 µeq/g. Allyl alcohol is believed to form when PO isomerizes when KOH is used as a catalyst. It has been observed that when DMC is used as the catalyst when making PO blocks, the resulting reaction mixture exhibits lower unsaturation levels suggesting less allyl formation. It is believed that allyl alcohol, when present can act as a secondary initiator and competes with mono-propylene glycol as the primary initiator, to form an allyl-PO block which is further ethoxylated to form an allyl-PO-EO diblock. It is further believed that this component likely causes increased foaming, as it appears structurally similar to pseudo-fatty alcohol ethoxylates which are known to be high foaming surfactants. Other unsaturation, such as propenyl unsaturation, may also exist in the composition. Preferably the total unsaturation is 30 µeq/g or less, 25 µeq/g or less, 20 µeq/g or less, 15 µeq/g or less or less than 5 µeq/g.

Allyl content can be determined using Nuclear Magnetic Resonance (NMR) spectroscopy according to the following method: Up to 2 gram of the sample is dissolved in 1.5 mL deuterated acetone (acetone-d6) (containing chromium (III) acetylacetonate as relaxation agent) (less than 2 grams of the sample may be used to produce clear homogeneous solutions for less soluble materials. A quantitative 13C NMR spectrum is acquired using a 10 mm probe head on a 500 MHz spectrometer. Additional proton a 2D spectra were acquired in acetone-d6 (0.2 g/mL) using a 5 mm probe head on a 400 MHz spectrometer. Total unsaturation level for each product was also measured using ASTM D4671. This measures all unsaturation in the polyalkylene glycol such as allyl and propenyl.

Also disclosed herein is a method for making an oxyethylene/oxypropylene block copolymer comprising the steps of A method for making an oxyethylene/oxypropylene block copolymer comprising the steps of:
  a) forming a first intermediate comprising an oxypropylene block by reacting propylene oxide with a polyol initiator (that is, diols or higher) in the presence of a Double Metal Cyanide catalyst, and
  b) reacting the first intermediate with ethylene oxide in the presence of a KOH catalyst.

In certain embodiments, the block copolymer may have an ABA structure, where A is an oxyethylene based block and B is an oxypropylene based block. For example, 1,2-propylene oxide is reacted onto a diol initiator, for example 1,2-propylene diol, to make an oxypropylene block (B). Thereafter ethylene oxide is added to synthesize a block of oxyethylene (A) and the final polymer has an ABA structure. A linear ABA is formed when a diol initiator such as ethylene glycol, 1,2-propylene glycol, 1,4 butylene glycol and neopentyl glycol is used. A diol initiator has two hydroxyl groups in the structure which are the sites for alkoxylation to synthesize the block copolymer. A branched structure is formed when a triol initiator is used. Glycerol and trimethylolpropane are preferred examples of a triol initiator and therefore these initiators contain three hydroxyl groups. For example, 1,2-propylene oxide is reacted on to the triol initiator (e.g. glycerol) to make three oxypropylene blocks (B) on the three hydroxyl groups of the initiator to form an i-(B)3 intermediate structure. Thereafter ethylene oxide is added to synthesize three blocks of oxyethylene (A) on each B block and the final polymer has an i-(BA)3 structure where i is the initiator (glycerol). Trimethylolpropane is an example of another triol based initiator.

Another branched structure is formed when a tetrol initiator is used. Pentaerythritol is an example of a tetrol initiator and contains four hydroxyl groups. For example, 1,2-propylene oxide is reacted on to the tetrol initiator (e.g. pentaerythritol) to make four oxypropylene blocks (B) on each hydroxyl of the initiator and having an intermediate structure of i-(B)4. Thereafter ethylene oxide is added to synthesize four blocks of oxyethylene (A) and the final polymer has an i-(BA)4 structure where i is the initiator (pentarythritol). Even higher initiators can be used, such as sorbitol.

Preferred DMC catalysts include complexes of zinc hexacyanocobaltate (III). Any amount of DMC catalyst which is effective to produce the desired first intermediate in a reaction with the initiator and PO can be used. The preferred DMC catalyst level is 30-50 ppm of the total amount of the polyalkylene glycol intermediate. DMC catalyst levels across the range 10-100 ppm can advantageously be used. Preferred temperatures for alkoxylation with PO are from 130° C. to 160° C.

Similarly, while any amount of KOH which is successful in producing the desired ABA polyalkylene glycol can be used, preferred KOH catalyst levels for the step of ethoxylating the intermediate are 100-2500 ppm of the total amount of polyalkylene glycol. It is believed that at least catalyst levels across the range 100-4000 ppm can be suitably used. Preferred temperatures for ethoxylation are from 120° C. to 150° C.

According to certain embodiments, the ABA structure is EO block-PO block-EO block represented by formula I

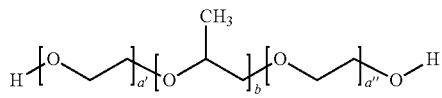

wherein a' and a" are independently in each occurrence an integer of 1 to 20 provided that a'+a" is at least 5 and no more than 40, and b is an integer of from 15 to 40.

According to certain water based hydraulic composition embodiments, the amount of the polyalkylene glycol is at least 5%, or at least 10%, or at least 15% by weight based on total weight of the composition. According to certain embodiments the amount of polyalkylene glycol is no more than 35%, or no more than 30% or no more than 25% by weight based on total weight of the composition.

According to certain embodiments the amount of water is at least 10%, or at least 15% or at least 25% or at least 30% by weight based on total weight of the composition. According to certain embodiments, the amount of water is no more than 60% or no more than 55% or no more than 50% by weight based on total weight of the composition.

In addition to the polyalkylene glycol and water, the compositions of the present invention may also include an amount of glycol, particularly when the compositions are targeted for use in hydraulic fluids. The glycol may be any glycol known for use in hydraulic fluids. Examples of such glycols are ethylene glycol, diethylene glycol, triethylene glycol, tetraethylene glycol and 1,2-propylene glycol. Mixtures of glycols may also be used. According to one embodiment the glycol is ethylene glycol or diethylene glycol. In fact use of the polyalkylene glycol block copolymers (especially an EO block-PO block-EO block PAG, i.e. EO-PO-EO PAG) with ethylene glycol or diethylene glycol shows an unexpected synergistic effect on increasing the viscosity The amount of the glycol, when present according to certain embodiments can advantageously be from 20% or 30% by weight based on total weight of the composition. The amount of glycol according to certain embodiments is preferably no more than 60% or no more than 50% by weight based on total weight of the composition.

Another optional component of the composition is an additive package. The additive package may have one or more additives selected from corrosion inhibitors (e.g. ferrous or vapor phase), lubricity aids, anti-foaming agents, air release additives anti-microbials, and dyes. The cumulative amount of the additives according to an embodiment is no more than 10% by weight based on total weight of the composition.

The hydraulic composition according to certain embodiments meets one of ISO-32, 46 and 68 viscosity grades (ISO is International Standards Organization) and therefore has typical kinematic viscosities at 40° C. of about 32, 46 and 68 mm2/sec (cSt) respectively. The composition according to certain embodiments has a kinematic viscosity at 40° C. greater than 25 mm2/sec as measured by ASTM D7042.

The compositions according to the present invention also exhibit reduced foaming behavior when compared to similar compositions having higher allyl content. Foaming behavior can be evaluated according to ASTM D1173: Standard Test Method for Foaming Properties of Surface-Active Agents, using deionized water at ambient temperature. Preferably, the compositions of the present invention may be characterized by exhibiting an initial foam height of less than 50 ml, or 40 ml or 30 ml at 0.5% by weight concentration and/or a foam height of less than 15 ml, 10 ml or 5 ml after 5 minutes as determined according to ASTM D1173.

The compositions of the present invention feature polyalkylene glycol components which are similar to those presented in WO 2020/086229, except for the allyl content. It is therefore believed that the present polyalkylene glycol components will exhibit similar biodegradability traits as those presented in this document, that is, the biodegradability when measured using OECD 301F is expected to be at least 60%, or at least 70% or at least 80% or at least 90%.

EXAMPLES

Preparation of PO Block Initiator

A PO block initiator is prepared as follows: Experiment is carried out on a five liter stainless steel reactor which is temperature controlled via an external thermostatic control unit. The oxide dosing system is controlled by weight and limited by a maximum pressure in the reactor of 4.0 barg. The reactor is operated through CAMILE TG software.

The required amount of Polypropylene glycol P400 starter (with an average molecular weight of 400 g/mol) (1115.6 gram) and 138 milligram of a DMC catalyst which can be obtained from Bayer AG under the trade name Arcol™ Cat 3, is charged into the reactor at 60° C. Arcol™ Cat 3 is reported to be a zinc hexacyanocobaltate (III) tertiary butyl alcohol/propylene glycol complex with a molecular formula of $C_{29}H_{52}Co_2N_{12}O_6Zn_3$. The reactor is flushed extensively with nitrogen and vacuum is applied while mixing at 400 rpm to a dry mixture. Next the reactor content is brought up to 160° C. and after reaching this temperature 14% of the total PO amount is fed for activation (181.6 gram PO). After activation, the remaining 3303.6 grams of PO is fed over a period of 2 hours and 5 minutes. After a digest period of 45 minutes, the reactor content is cooled to 100° C. and vacuum is applied. After approximately 30 minutes the reactor content was taken out of the reactor.

Preparation of ABA TriBlocks

Experiments to form triblock polyalkylene glycols are carried out on a 10.3 liter stainless steel reactor which is temperature controlled via an external thermostatic control unit. The oxide dosing system is controlled by weight and limited by a maximum pressure in the reactor of 3.5 barg. When the desired amount of oxide is fed, the oxide feeding is automatically stopped.

Example 1

For Example 1, 3674.63 gram of an Initiator as described above and 4.75 gram of 45 wt % aqueous KOH are charged into the reactor at room temperature. In order to limit any discoloration due to oxidation of the initiator in the presence of the base catalyst, the reactor is flushed extensively with nitrogen. Next the reactor content is brought to 115° C. while mixing at approximately 230 rpm. The water is removed from the starter/catalyst mixture by applying 30 mbar vacuum. After 1 hour at reduced pressure, a sample is taken from the reactor content and the water content is determined by titration (805 ppm of water was measured). What remained in the reactor (3671.39 gram Initiator, 2.14 gram KOH equivalent (403 ppm) and 2.96 gram of water) is brought to about 1.2 bar with nitrogen. Next the temperature of the reactor mixture is increased to 135° C. while mixing at 250 rpm. After reaching this temperature 1636 gram EO is fed over a period of 4 hours and 30 minutes. After a digest period of 15 hours the reactor content is cooled to about 70° C. and 25 gram magnesium silicate is added to absorb the potassium catalyst. After approximately 30 minutes of mixing, the reactor content is taken out of the reactor and filtered using a Buchner funnel with a paper filter type 1288 from Sartorius Stedim Biotech until the product is clear. The filtered product has a total unsaturation level of 0.002 meq/g (i.e., 2 µeq/g) an allyl level of <5 µeq/g and a 1% cloud point of 28-30° C. using ASTM D2024. The product has a molecular weight of 2493 g/mol using ASTM D4274, a kinematic viscosity at 40° C. of 222 mm2/sec and a kinematic viscosity at 100° C. of 34.4 mm2/sec using ASTM D7042. The PAG contains approximately 30% by weight of oxyethylene as determined by NMR.

Example 2

For Example 2, 702.21 gram of an Initiator as described above and 4.77 gram of 45 wt % KOH are charged into the reactor at room temperature. In order to limit any discoloration due to oxidation of the initiator in the presence of the base catalyst, the reactor is flushed extensively with nitrogen. Next the reactor content is brought to 115° C. while mixing at approximately 220 rpm. The water is removed from the starter/catalyst mixture by applying 30 mbar vacuum. After 40 minutes at reduced pressure, a sample is taken from the reactor content and the water content is determined by titration (2010 ppm of water was measured). What remained in the reactor (699.64 gram Initiator, 2.14 gram KOH equivalent and 1.41 gram of water) is further dried by applying again 30 mbar vacuum for an additional 1 hour and 10 minutes. A sample is taken and the water content was determined by titration to ne 1000 ppm water. What remained in the reactor (696.84 gram Initiator, 2.13 gram KOH equivalent (2110 ppm) and 0.36 gram of water) is brought to about 1.2 bar with nitrogen. Next the temperature of the reactor mixture is increased to 135° C. while mixing at 250 rpm. After reaching this temperature 310.5 gram EO is fed over a period of about 35 minutes. After a digest period of 15 hours and 30 minutes the reactor content is cooled to about 60° C. and 23 gram magnesium silicate is added to absorb the potassium catalyst. After approximately 30 minutes of mixing, the reactor content is taken out of the reactor and filtered using a Buchner funnel with a paper filter type 1288 from Sartorius Stedim Biotech until the product is clear. The filtered product has a total unsaturation level of 0.004 meq/g (i.e., 4 µeq/g), an allyl level of <5 µeq/g and a 1% cloud point of 28-30° C. using ASTM D2024. It has a molecular weight of 2377 g/mol using ASTM D4274, a kinematic viscosity at 40° C. of 215 mm2/sec and a kinematic viscosity at 100° C. of 35.1 mm2/sec using ASTM D7042. The PAG contains approximately 30% by weight of oxyethylene.

Assessment of Foaming Properties

The foaming properties of Example 1 and Example 2 along with comparative Example 1 (an ABA polyalkylene glycol (EO-PO-EO) made using only KOH catalyst for the B block and KOH for the A blocks, and having a total unsaturation level of 0.0428 meq/g (42.8 µeq/g) with an allyl level of 35 µeq/g) were evaluated according to ASTM D1173 but at ambient temperature (23° C.) instead of the recommended temperature of 49° C. per the method: Comparative Example 1 has a molecular weight of 2367 g/mol, a kinematic viscosity at 40° C. of 212 mm2/sec and a kinematic viscosity at 100° C. of 34.2 mm2/sec and has an oxyethylene content of 30% and an oxypropylene content of 70% by weight of the polymer. Standard Test Method for Foaming Properties of Surface-Active Agents., both method 1 and method 2 as follows:

Summary of Method 1

Prepare 0.1% aqueous solution of the test polymer using deionized water. Rinse the walls of the receiver with 50 mL of the test solution, using a pipet and after draining to the bottom of the receiver, adjust the stopcock so that the level of the solution in the receiver is exactly at the 50-mL mark. The receiver is a chemically resistant glass tube having an internal diameter of 50 mm with one end constricted and sealed to a straight bore, standard taper No. 6 stopcock having a 6 mm bore and 12 mm stem. The receiver contains graduation marks which can show the volume of fluid in the receiver. Further details are described in the ASTM procedure. The receiver is mounted in a standard wall tubular jacket having an internal diameter of 70 mm fitted with inlet and outlet connections. The jacket is connected to a source of water and the water temperature thermostatically controlled. In our experiments the water temperature was ambient. Fill the foam pipet with the test solution to the 200-mL mark, using a slight suction for the purpose. Immediately place it in position at the top of the receiver making certain that the lower pipet tip is centered in the foam receiver and open the stopcock. When all of the solution has run out of the pipet, start a stop-watch, take an initial foam height reading at t=0 minute followed by a final t=5 minute reading. Take the reading by measuring the foam production at the top of the foam column at the highest average height to which the rim of the foam has reached. This height is proportional to the volume of air remaining in the foam.

Summary of Method 2

The foam test was conducted per Method 1 except a 0.5% solution was used and foam heights were measured at time T=0, 1, 2, 3, 4 and 5 minutes.

Results from Method 1 are shown in Table 1

|  | Ex. 1 | Ex. 2 | Comp. Ex 1 |
|---|---|---|---|
| Time. (mins) | 0.1% in H2O | 0.1% in H2O | 0.1% in H2O |
| Initial/5 Mins. (in mls) | 30/0 | 50/0 | 60/15 |

Results using Method 2 are shown in Table 2

| Ross Miles [mm] 0.5% in H2O | Mins. | Ex.1 0.5% in H2O | Comp. Ex 1 0.5% in H2O | Ex. 1 repeat 0.5% in H2O | Comp. Ex 1 repeat 0.5% in H2O | Ex.1 repeat 0.5% in H2O | Comp. Ex 1 repeat 0.5% in H2O |
|---|---|---|---|---|---|---|---|
|  | 0 |  | 40 | 60 | 40 | 60 | 40 | 60 |
| Foam height (mm) | 1 | 5 | 20 | 5 | 20 | 5 | 20 |
| Foam height (mm) | 2 | 0 | 15 | 0 | 15 | 0 | 15 |
| Foam height (mm) | 3 | 0 | 15 | 0 | 15 | 0 | 15 |
| Foam height (mm) | 4 | 0 | 15 | 0 | 15 | 0 | 15 |
| Foam height (mm) | 5 | 0 | 15 | 0 | 15 | 0 | 15 |

The invention claimed is:

1. An aqueous composition comprising a polyalkylene glycol block copolymer wherein the polyalkylene glycol has a molecular weight of no more than 4000 g/mol and is characterized in that it is an oxyethylene/oxypropylene block copolymer having a weight percent of oxyethylene of at least 20% based on total weight of the copolymer and an allyl content of less than 20 µeq/g.

2. The composition of claim 1 characterized by exhibiting an initial foam height of less than 50 ml at 0.5% by weight concentration in deionized water and less than 15 ml after 5 minutes as determined according to ASTM D1173 at ambient temperature.

3. The composition of claim 1 wherein the polyalkylene glycol block copolymer has a biodegradability of at least 60% as determined using OECD 301F.

4. The composition of claim 1 further comprising a glycol, wherein the glycol is selected from ethylene glycol and diethylene glycol.

5. The composition of claim 1 wherein the block copolymer has a triblock structure with two oxyethylene blocks on either side of an oxypropylene block.

6. The composition of claim 1 wherein the weight percent of oxyethylene in the polyalkylene glycol is less than 40%.

7. The composition of claim 1 wherein the water is present in an amount of 10 to 60 percent by weight.

8. The composition of claim 1 further comprising one or more additives selected from corrosion inhibitors, friction modifiers, anti-wear additives, air release additives, foam control agents, anti-microbials and dyes.

9. The composition of claim 1 wherein the polyalkylene glycol has the formula

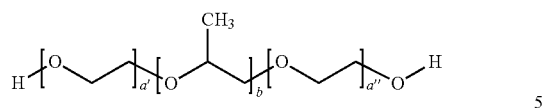
wherein a' and a" are independently in each occurrence an integer of 1 to 20 provided that a'+a" is at least 5 and no more than 40, and b is an integer of from 15 to 40.
* * * * *